(12) United States Patent
Armour

(10) Patent No.: US 7,811,036 B2
(45) Date of Patent: Oct. 12, 2010

(54) LOAD ANCHOR

(75) Inventor: Barry Douglas Armour, 70 Green Island Bush Road, R.D. 1, Dunedin (NZ)

(73) Assignees: Barry Douglas Armour, Dunedin (NZ), Trustee of Moritz Trust; Fiona Lynn Armour, Dunedin (NZ), Trustee of Moritz Trust; HGW Trustee's Limited, Dunedin (NZ), Trustee of Moritz Trust ( * ) Notice: Subject to any disclaimer, the term of this patent is extended or adjusted under 35 U.S.C. 154(b) by 224 days.

(21) Appl. No.: 11/575,048

(22) PCT Filed: Mar. 10, 2005

(86) PCT No.: PCT/NZ2005/000042
§ 371 (c)(1),
(2), (4) Date: Dec. 12, 2008

(87) PCT Pub. No.: WO2006/028387
PCT Pub. Date: Mar. 16, 2006

(65) Prior Publication Data
US 2009/0116926 A1    May 7, 2009

(30) Foreign Application Priority Data
Sep. 10, 2004  (NZ) ...................... 535235
Oct. 18, 2004  (NZ) ...................... 535994

(51) Int. Cl.
*B60P 7/08*  (2006.01)
(52) U.S. Cl. .................. 410/107; 410/111; 410/109
(58) Field of Classification Search .................. 410/77, 410/96, 101, 102, 106–116
See application file for complete search history.

(56) References Cited

U.S. PATENT DOCUMENTS
3,709,156  A   1/1973  Bowers (Continued)

FOREIGN PATENT DOCUMENTS
DE    200 16 102 U1    4/2001

(Continued)

OTHER PUBLICATIONS
International Search Report for PCT Counterpart Application No. PCT/NZ2005/000042, 2 pgs (Jun. 22, 2005).

*Primary Examiner*—Patricia L Engle
(74) *Attorney, Agent, or Firm*—Blakely, Sokoloff, Taylor & Zafman LLP

(57) ABSTRACT

A load anchor has a support 103 with an upper surface. A tongue 105 with an aperture 113 for receipt of a tie down strap is pivotable relative to the support 103 from a first position wherein the tongue 105 is substantially flush with the upper surface of the support 103 to a second position extending above the support so that the aperture 113 is exposed. The load anchor may have a lever arrangement 111 accessible through the aperture 113 in the tongue when the tongue is in the first position, so that downward force applied to part of the lever arrangement 111 through the aperture 113 pivots the lever arrangement 111 which lifts the tongue 105 from the first position. The tongue 105 may be pivotally connected relative to the support member 103 by an integrally formed shaft or shafts 107.

30 Claims, 17 Drawing Sheets

U.S. PATENT DOCUMENTS

| | | |
|---|---|---|
| 3,917,213 A | 11/1975 | Poehlmann |
| 3,955,847 A | 5/1976 | Schiowitz |
| 4,126,095 A | 11/1978 | Tillery |
| 4,762,449 A | 8/1988 | St. Pierre et al. |
| 4,948,311 A | 8/1990 | St. Pierre et al. |
| 5,535,694 A | 7/1996 | Czipri |
| 5,749,686 A | 5/1998 | Butcher et al. |
| 5,957,640 A | 9/1999 | Schmieke et al. |
| 6,065,917 A | 5/2000 | Shambeau et al. |
| 6,099,220 A | 8/2000 | Poth |
| 6,168,360 B1 | 1/2001 | Knox |
| 6,234,101 B1 | 5/2001 | Czipri |
| 6,494,651 B1 | 12/2002 | Zhan et al. |
| 6,533,512 B2 | 3/2003 | Lin |
| 6,585,466 B2 | 7/2003 | Zhan et al. |
| 6,709,209 B2 | 3/2004 | Zhan et al. |
| 7,124,475 B2 | 10/2006 | Jeffries |
| 2002/0006317 A1 | 1/2002 | Hofmann et al. |

FOREIGN PATENT DOCUMENTS

| | | |
|---|---|---|
| EP | 0 685 362 A1 | 12/1995 |
| WO | WO 93/09006 | 5/1993 |

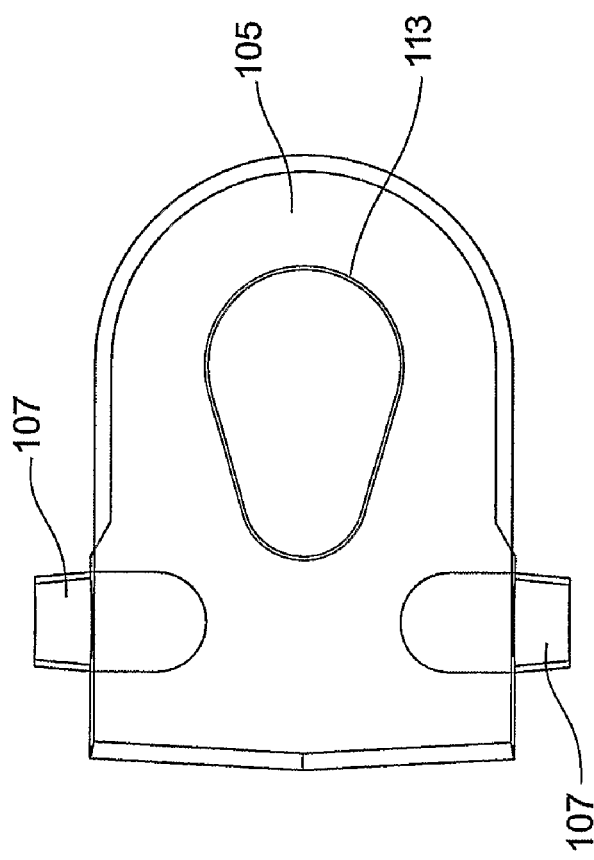
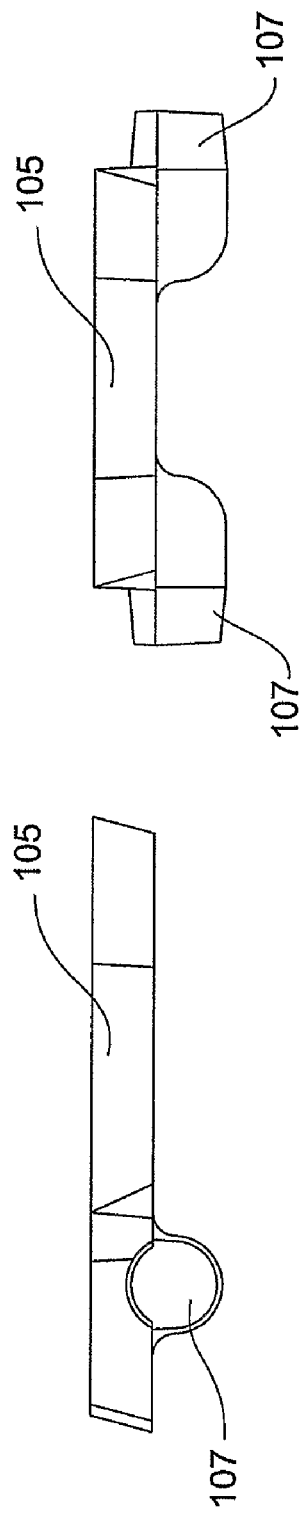
FIGURE 14a
FIGURE 14b
FIGURE 14c

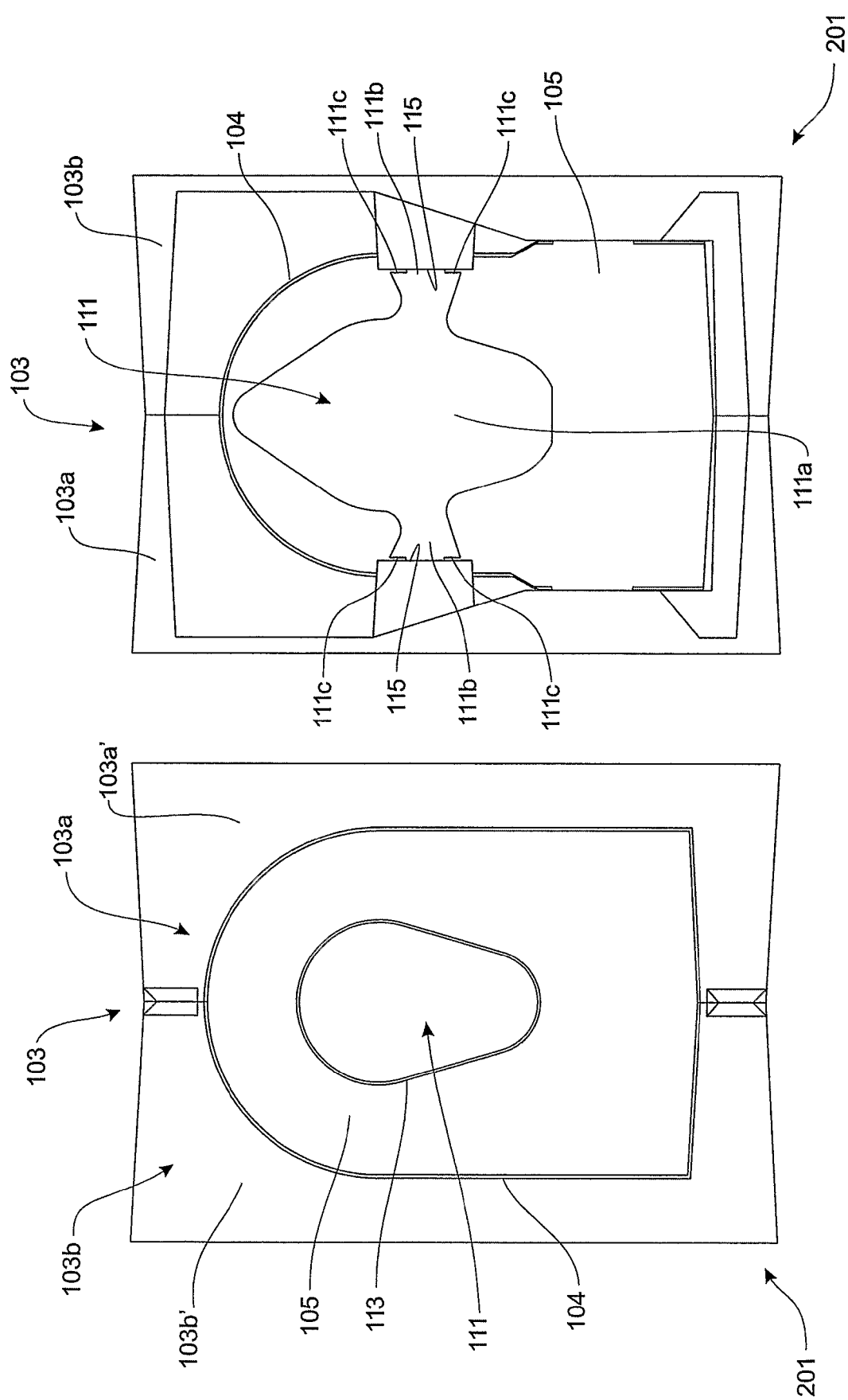

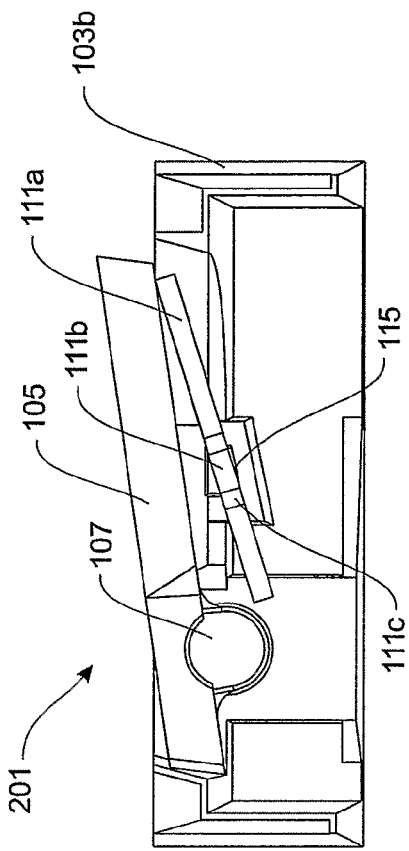
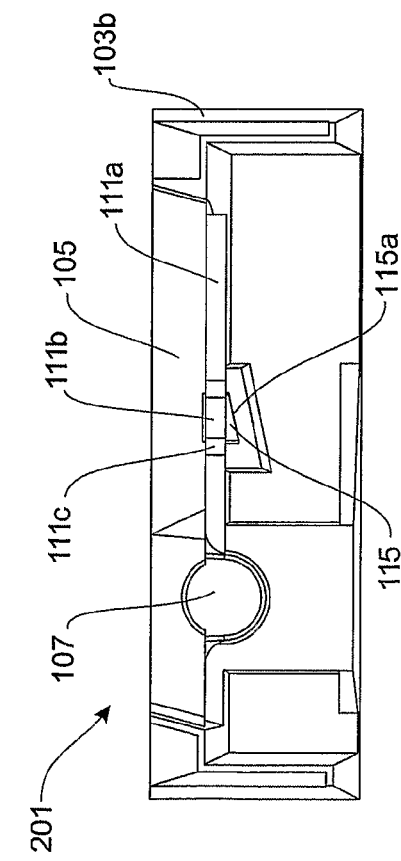
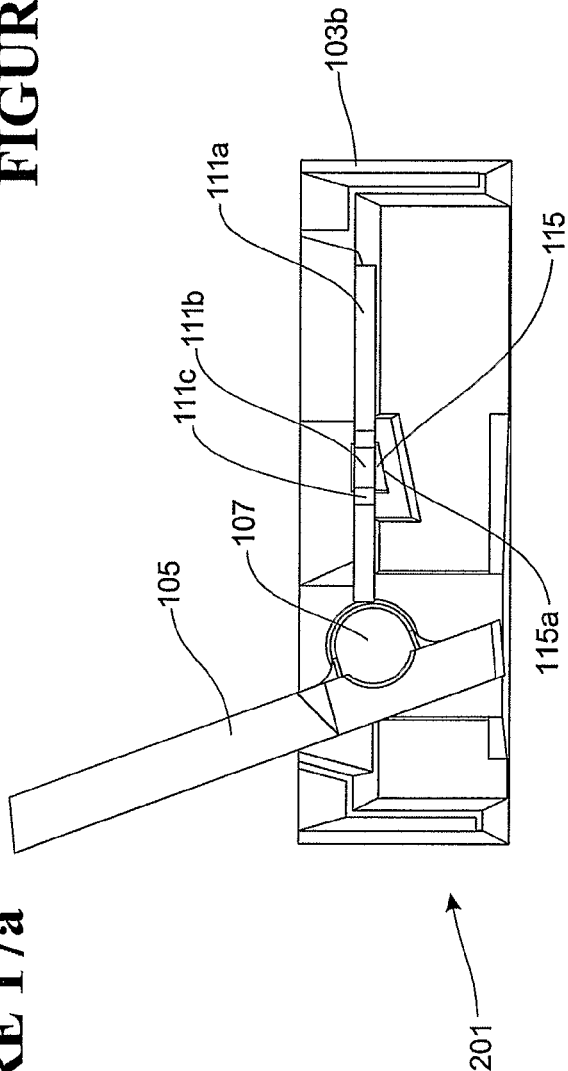
FIGURE 17a
FIGURE 17b
FIGURE 17c

LOAD ANCHOR

CROSS-REFERENCE TO OTHER APPLICATIONS

This is a National Phase of international Application No. PCT/NZ2005/000042 filed on Mar. 10, 2005, which claims priority from New Zealand Patent Application No. 535235 filed on Sep. 10, 2004 and New Zealand Patent Application No. 535994 filed on Oct. 18, 2004.

FIELD OF THE INVENTION

The invention relates to a load anchor for use in the transport industry.

BACKGROUND

Trucks with a load carrying region such as a deck, tray, or trailer are often used to transport loads or other vehicles. However, the load or vehicle may shift during transportation and therefore should be secured to the load carrying region. The load is often secured using ropes, straps, or chains stretched over the load or part of the load and fastened to load anchors. It is often necessary to secure loads in other load carrying vehicles such as aircraft, ships, railway carriages, and the like.

There are a number of load anchors for use with load carrying regions of vehicles. For example, hooks or chains may be attached to the tray of a truck to provide anchors for the straps. Such attachments protrude into the load carrying region of the truck deck, tray, or trailer and can easily snag or catch the load as it is being moved on the tray.

U.S. Pat. No. 4,762,449 and U.S. Pat. No. 4,948,311 describe tie down assemblies for fitting in the side wall of the tray of a pickup truck. Due to the vertical orientations of their tongues or hooks, the size of the tie down assemblies, and the tongues or hooks having an aperture through which a pivot pin extends, the tie down assemblies have low load capacities, and are particularly unsuitable for accommodating any significant side loadings (loadings in a direction transverse to the plane of the hook or tongue in the embodiment shown in those documents).

U.S. Pat. No. 5,749,686 describes a container stop for a railcar well. The stop is mounted within a side wall of the railcar well, and has an elongate stop member which is moveable from a position in which it is received within the side wall of the railcar to a position in which it extends diagonally from the side wall of the railcar and engages in a hole in the floor of the railcar well. The elongate stop member includes holes through which a pivot shaft extends, to pivotally mount the stop member. When the stop member is in the position in which it is received in the side wall, it does not sit flush with the side wall. While that would not cause any significant difficulty when the device is wall mounted, if the device was mounted in a floor, items could catch on the edges of the device as it does not sit flush with the surface in which it is mounted. Further, due to the pivot shaft extending through holes in the elongate stop member, side loading capacity is reduced, and it is necessary for the elongate member to engage in an aperture in the railcar floor to provide sufficient side loading. In order to release the elongate member from its retracted position, it is necessary for an operator to have access to the outer side of the side wall, to release a latch member. Again, while that would not cause too much difficulty in the case of a railcar which has low side walls, it could cause difficulties for some other applications.

A lightweight hold down assembly for a wheel chair is described in U.S. Pat. No. 3,955,847.

It is an object of at least preferred embodiments of the present invention to provide a load anchor which goes some way towards ameliorating at least one of the disadvantages outlined above, and/or which at least provides the public with a useful choice.

SUMMARY OF THE INVENTION

In accordance with a first aspect of the present invention, there is provided a load anchor comprising:
  a support having an upper surface;
  a tongue with an aperture for receipt of part of a tie down strap and which is pivotable relative to the support from a first position wherein the tongue is substantially flush with the upper surface of the support to a second position extending generally upwardly from the support such that the aperture is at least partly exposed above the upper surface; and
  a lever arrangement beneath the tongue and accessible through the aperture in the tongue when the tongue is in the first position, configured such that downward force applied to part of the lever arrangement through the aperture pivots the lever arrangement which lifts the tongue from the first position.

The term 'comprising' as used in this specification and claims means 'consisting at least in part of', that is to say when interpreting statements in this specification and claims which include that term, the features prefaced by that term in each statement all need to be present but other features can also be present.

As used in this specification and claims, the terminology "upper", "upwardly", "downward", and the like are used to describe relative directions. It will be appreciated that in use, the load anchor could be installed in different orientations. The claims should be construed sufficiently broadly to encompass such orientations.

The lever arrangement may comprise a lever member which is pivotally mounted below the tongue.

The lever arrangement is preferably configured to substantially cover the aperture in the tongue from its underside when the tongue is in the first position.

The support may comprise two flanges, and the tongue and lever arrangement may be pivotally mounted to the flanges.

The support may comprise a housing which generally surrounds a perimeter of the tongue when the tongue is in the first position. An underside of the housing is advantageously generally open, to enable debris to exit the housing when the tongue is out of the first position.

Preferably, the load anchor is configured such that when the tongue is in the first position the load anchor is generally closed to minimise any passing of debris through the load anchor from above the upper surface, and when the tongue is in the second position the load anchor is generally open to enable debris to fall through the load anchor from above the upper surface.

The tongue may be pivotally mounted relative to the support by a pivot shaft or shafts. The tongue may be pivotally mounted relative to the support by two stub shafts, one of which extends outwardly from each side of the tongue to pivotally engage the support.

Preferably, the shaft(s) is/are integral with the tongue. More preferably, the tongue and shaft(s) are an integrally cast component.

In a preferred embodiment, the shaft(s) is/are rotatable relative to the support about an axis of rotation, and the tongue is substantially planar and is configured with the shaft(s) such that the plane of the tongue is generally parallel with the axis of rotation of the shaft(s).

The load anchor preferably has a load capacity of at least about 8 tonnes.

The load anchor may be mounted to a load carrying region of a vehicle such that in the first position of the tongue, the tongue lies substantially flush with a floor of the load carrying region, and in the second position of the tongue, the aperture in the tongue is at least partly exposed above the floor of the load carrying region. Alternatively, the load anchor may be mounted to a load carrying region of a vehicle such that in the first position of the tongue, the tongue lies substantially flush with a wall of the load carrying region, and in the second position of the tongue, the aperture of the tongue is at least partly exposed inwardly of the wall of the load carrying region.

Preferably, the aperture in the tongue is fully exposed when the tongue is in the second position.

In accordance with a second aspect of the present invention, there is provided a vehicle for carrying a load, the vehicle comprising:
 a load carrying region having a load supporting surface;
 and at least one load anchor which comprises:
 a tongue with an aperture for receipt of part of a tie down strap and which is pivotable relative to the load supporting surface from a first position wherein the tongue is substantially flush with the load supporting surface to a second position in which the tongue extends from the load supporting surface such that the aperture is at least partly exposed in the load carrying region; and
 a lever arrangement associated with the tongue and accessible through the aperture in the tongue when the tongue is in the first position, configured such that force applied to part of the lever arrangement through the aperture pivots the lever arrangement which moves the tongue from the first position towards the second position.

As used in this specification and claims, the term "vehicle" should be construed broadly as an apparatus for carrying a load. The vehicle need not be self-propelled. The vehicle could be a truck, aircraft, ship, or train, for example. Alternatively, the vehicle could be a truck tray, deck, or trailer, or a rail car for example. As another example, the vehicle could be a shipping container.

The lever arrangement may comprise a pivotally mounted lever member.

The lever arrangement may be configured to substantially cover the aperture in the tongue from one side when the tongue is in the first position.

Preferably, the load supporting surface is a floor of the load carrying region, and a region beneath the lever arrangement is generally open, to enable debris to exit the load anchor when the tongue is out of the first position.

Preferably, the load anchor is configured such that when the tongue is in the first position the load anchor is generally closed to minimise any passing of debris through the load anchor, and when the tongue is in the second position the load anchor is generally open to enable debris to pass through the load anchor.

The tongue may be pivotally mounted relative to the load supporting surface by a pivot shaft or shafts. The tongue may be pivotally mounted relative to the load supporting surface by two stub shafts, one of which extends outwardly from each side of the tongue.

The shaft(s) may be integral with the tongue. Preferably, the tongue and shaft(s) are an integrally cast component.

In a preferred embodiment, the shaft(s) is/are rotatable relative to the load supporting surface about an axis of rotation, and the tongue is substantially planar and is configured with the shaft(s) such that the plane of the tongue is generally parallel with the axis of rotation of the shaft(s).

Preferably, the aperture in the tongue is fully exposed when the tongue is in the second position.

The vehicle is suitably a truck, or may be a trailer for use with a truck for example. In an advantageous alternative embodiment, the vehicle may be a shipping container.

In accordance with a third aspect of the present invention, there is provided a load anchor comprising:
 a support having an upper surface; and
 a plate-like tongue which has an aperture for receipt of part of a tie down strap and an integral pivot shaft or shafts which pivotally connect the tongue relative to the support such that the tongue is moveable from a first position wherein it is substantially flush with the upper surface of the support to a second position extending generally upwardly from the support such that the aperture is at least partly exposed above the upper surface.

The shaft (s) may be welded to the tongue. Alternatively, the tongue and shaft(s) may be an integrally cast component.

The support may comprise two flanges, with the tongue pivotally mounted to the flanges.

The support may comprise a housing which generally surrounds a perimeter of the tongue when the tongue is in the first position. An underside of the housing is advantageously generally open, to enable debris to exit the housing when the tongue is out of the first position.

Preferably, the load anchor is configured such that when the tongue is in the first position the load anchor is generally closed to minimise any passing of debris through the load anchor from above the upper surface, and when the tongue is in the second position the load anchor is generally open to enable debris to fall through the load anchor from above the upper surface.

The tongue may be pivotally mounted relative to the support by two stub shafts, one of which extends outwardly from each side of the tongue to pivotally engage the support.

Preferably, the shaft(s) is/are rotatable relative to the support about an axis of rotation, and the tongue is substantially planar and is configured with the shaft(s) such that the plane of the tongue is generally parallel with the axis of rotation of the shaft(s).

The load anchor preferably has a load capacity of at least about 8 tonnes.

Preferably, the aperture in the tongue is fully exposed when the tongue is in the second position.

The load anchor may be mounted to a load carrying area of a vehicle such that in the first position of the tongue, the tongue lies substantially flush with a floor of the load carrying region, and in the second position of the tongue, the aperture in the tongue is at least partly exposed above the floor of the load carrying region. Alternatively, the load anchor may be mounted to a load carrying area of a vehicle such that in the first position of the tongue, the tongue lies substantially flush with a wall of the load carrying region, and in the second position of the tongue, the aperture in the tongue is at least partly exposed inwardly of the wall of the load carrying region.

In accordance with a fourth aspect of the present invention, there is provided a vehicle for carrying a load, the vehicle comprising:
 a load carrying region having a load supporting surface;
 and at least one load anchor which comprises:
 a plate-like tongue which has an aperture for receipt of part of a tie down strap and an integral pivot shaft or shafts which pivotally mount the tongue relative to the load supporting surface such that the tongue is moveable from a first position wherein it is substantially flush with the load supporting surface to a second position extending from the load supporting surface such that the aperture is at least partly exposed in the load carrying region.

The shaft(s) may be welded to the tongue. Alternatively, the tongue and shaft(s) are an integrally cast component.

Preferably, the load supporting surface is a floor of the load carrying region, and a region beneath the load anchor is generally open, to enable debris to exit the load anchor when the tongue is out of the first position.

Preferably, the load anchor is configured such that when the tongue is in the first position the load anchor is generally closed to minimise any passing of debris through the load anchor, and when the tongue is in the second position the load anchor is generally open to enable debris to pass through the load anchor.

The tongue may be pivotally mounted relative to the load supporting surface by two stub shafts, one of which extends outwardly from each side of the tongue.

Preferably, the shaft(s) is/are rotatable relative to the load supporting surface about an axis of rotation, and the tongue is substantially planar and is configured with the shaft(s) such that the plane of the tongue is generally parallel with the axis of rotation of the shaft(s).

Preferably, the aperture in the tongue is fully exposed when the tongue is in the second position.

The vehicle is suitably a truck, or may be a trailer for use with a truck for example. In an advantageous alternative embodiment, the vehicle may be a shipping container.

The invention consists in the foregoing and also envisages constructions of which the following gives examples only.

BRIEF DESCRIPTION OF THE DRAWINGS

Preferred embodiments of the present invention will now be described with reference to the accompanying drawings in which:

FIGS. 14a, b, and c are underside, side, and end views respectively of the tongue of the second preferred embodiment load anchor;

FIGS. 16a and 16b are overhead and underside views of the assembled preferred embodiment load anchor, with the tongue in the non-operative configuration; and FIGS. 17a, 17b, and 17c are side views showing the components of FIG. 15, with the load anchor in non-operative, intermediate, and operative configurations respectively.

DETAILED DESCRIPTION

Figure 1:
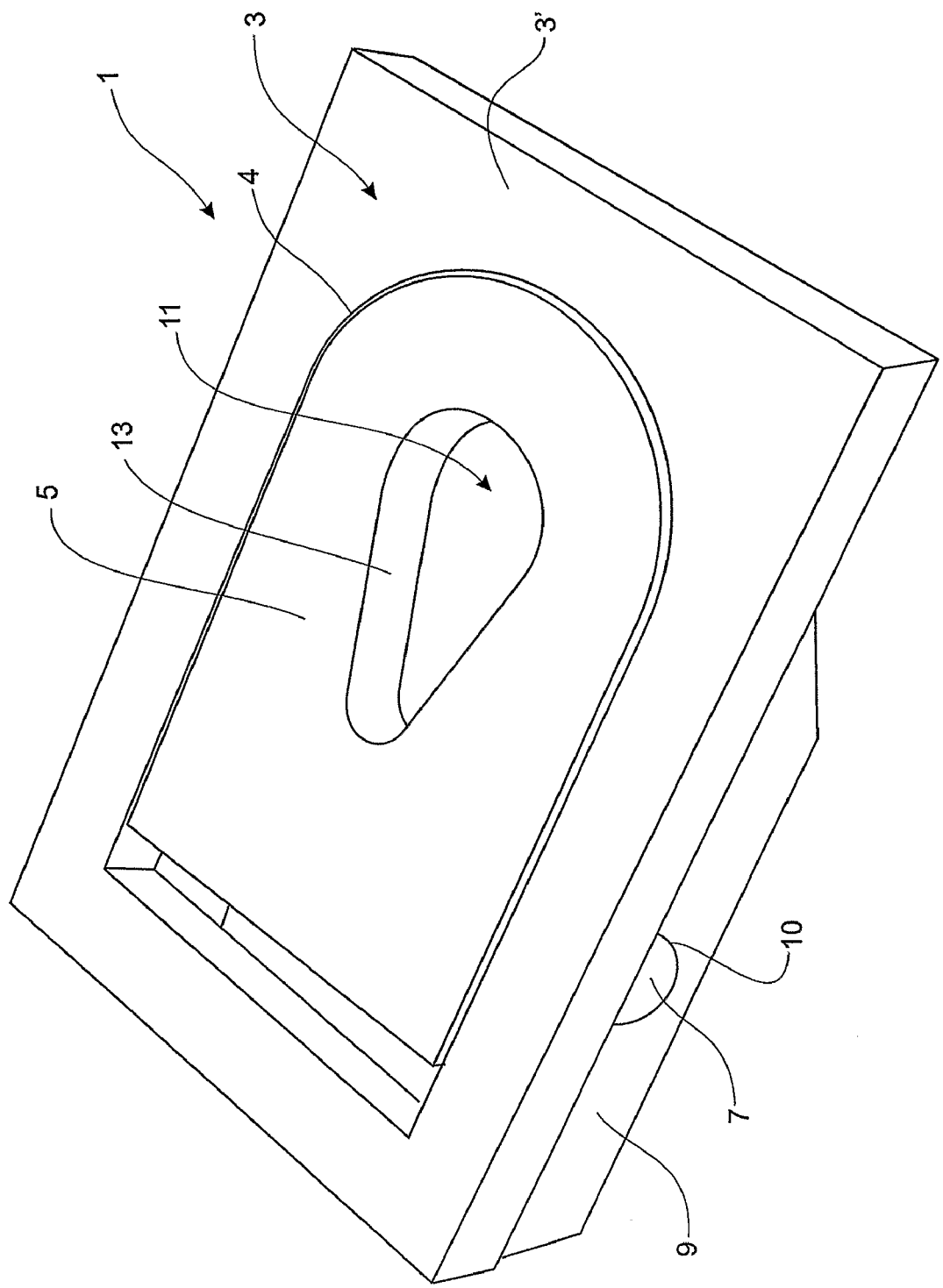
FIG. 1 is an overhead perspective view of a first preferred embodiment load anchor in a first, non-operative position.

Referring to FIGS. 1 to 6, a first preferred embodiment load anchor 1 has a support 3, a tongue 5, a pivot comprising a pivot shaft 7 which is received in side flanges 9 extending from the support 3, and a lever arrangement 11 associated with the tongue to assist in lifting the tongue. An aperture 13 is provided in the tongue for receipt of part of a tie down strap, chain, or the like.

In the embodiment shown, the support 3 is in the form of a plate which is preferably substantially rectangular in shape, although other shapes could be used if desired. As will be described below with reference to the second preferred embodiment, the support may be in a different form, such as a housing which generally surrounds a perimeter of the tongue. The support 3 is provided with an aperture 4. The aperture in the support provides a cavity for receiving the tongue when in the non-operative position shown in FIG. 1.

The support 3 includes side flanges 9 which extend from each side of the plate, and may be formed as an integral part of the support or may be connected to the support such as by welding or the like. Each side flange is provided with an aperture 10 for receiving part of the pivot shaft 7. The shaft can rotate within the apertures 10 about a longitudinal axis of the shaft, which enables the tongue to pivot relative to the support.

In the embodiment shown, the tongue 5 is a plate-like member, and is preferably substantially rectangular. The free end of the tongue preferably has rounded corners. The pivot shaft is integral with the tongue, and in the embodiment shown is made integral by welding at or towards a first, proximal end of the tongue, as shown by welds W. The pivot shaft is preferably at or towards a first, proximal end of the tongue. In the embodiment shown, the tongue is generally planar, and is configured with the pivot shaft such that the plane of the tongue is substantially parallel to the rotational axis of the pivot shaft. The ends of the pivot shaft 7 extend into or through the apertures 10 in the side flanges. Rather than having a single shaft, the pivot may be provided by two stub shafts for example, as will be described below for the second embodiment. The aperture 13 is preferably towards a second, distal end of the tongue.

The tongue is moveable from a first, non-operative position wherein it is substantially flush with an upper surface 3' of the support 3 to a second, operative position wherein it extends generally upwardly from the support such that the aperture 13 is exposed above the upper surface 3' of the support 3. The non-operative position is shown in FIG. 1 and the operative position is shown in FIG. 5.

Figure 5:
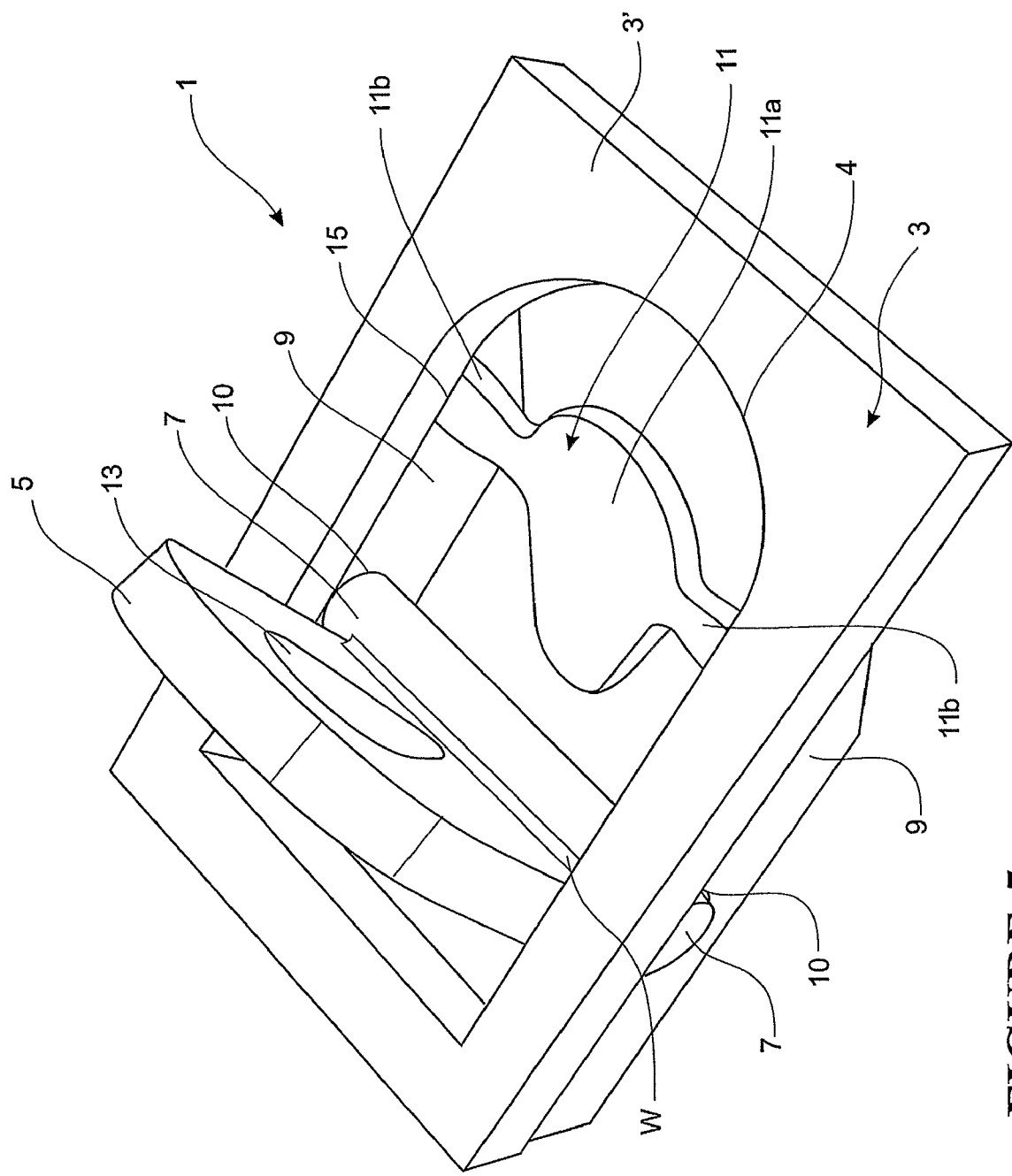
FIG. 5 is an overhead perspective view of the load anchor of FIG. 1 in the second, operative position.
Figure 6:
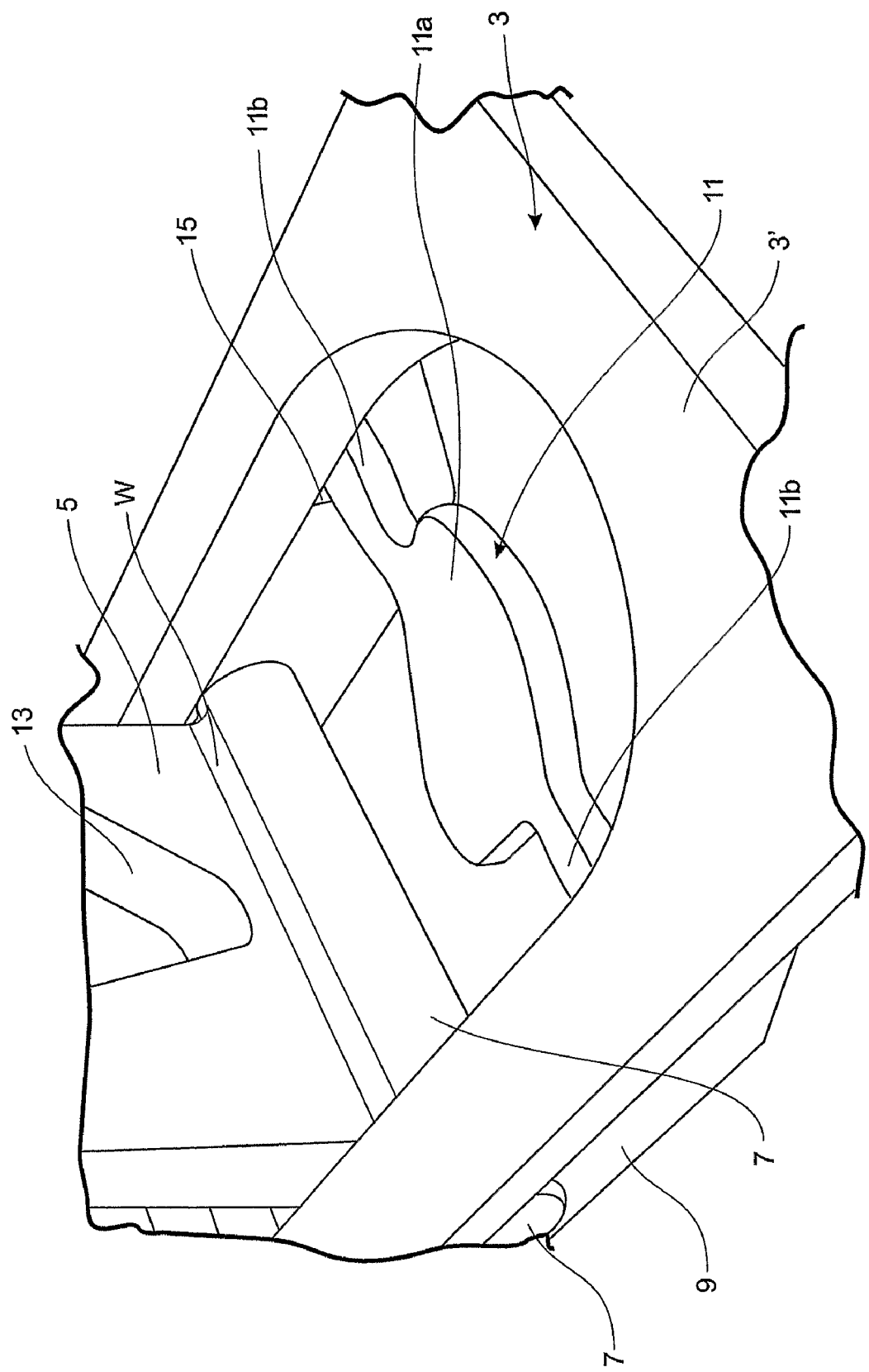
FIG. 6 is an overhead perspective view of part of the load anchor in the position of FIG. 5.

The lever arrangement 11 is configured to assist in moving the load anchor from the non-operative position shown in FIG. 1 towards the operative position shown in FIG. 5. The lever arrangement 11 comprises a plate-like lever member 11a which is pivotally connected to the side flanges 9; in this embodiment by arms 11b extending from the lever member 11a and which extend into or through the apertures 15 in the side flanges 9.

Figure 2:
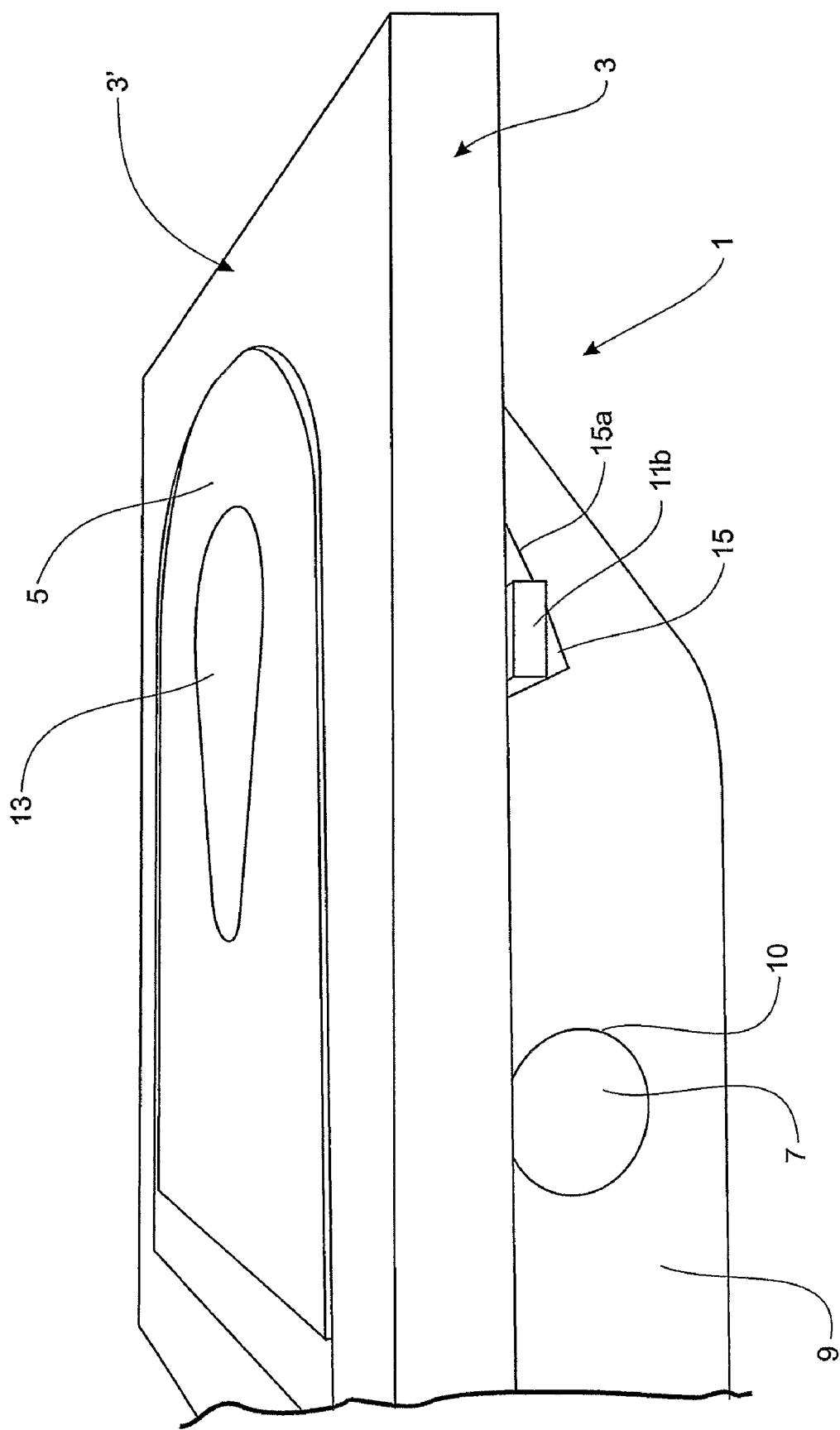
FIG. 2 is a side view of the load anchor of FIG. 1 in the non-operative position.
Figure 3:
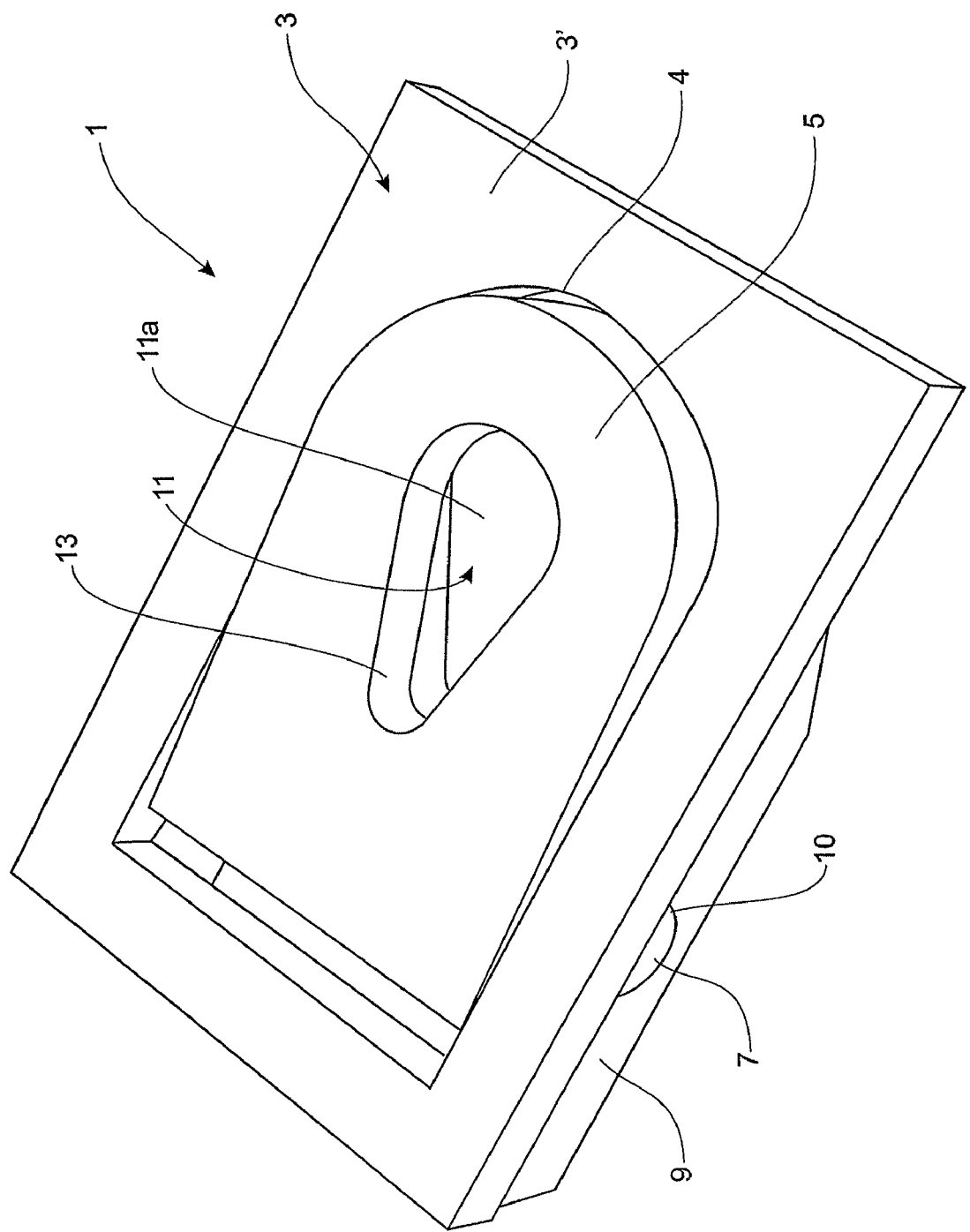
FIG. 3 is an overhead perspective view of the load anchor of FIG. 1 between the first, non-operative position and a second, operative position.
Figure 4:
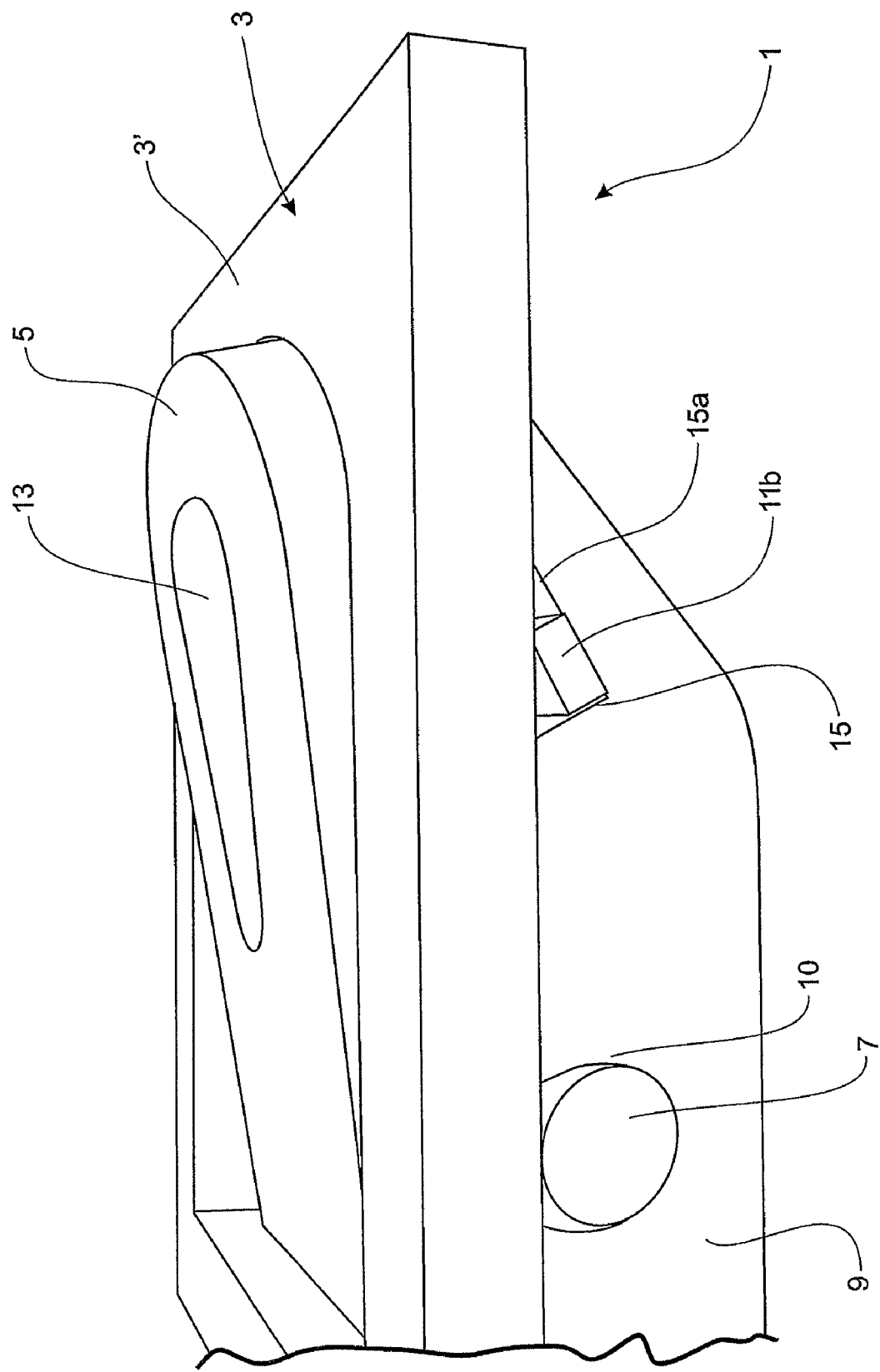
FIG. 4 is a side view of the load anchor in the position of FIG. 3.

As shown in FIGS. 2 and 4, the arms 11b of the lever arrangement 11 are preferably substantially rectangular in cross-section, and the apertures 15 preferably include angled lower surfaces 15a as shown. The angled lower surfaces 15a of the apertures 15 may determine the maximum tilt of the lever member 11a relative to the side flanges 9 and support member 3. Other pivot arrangements could be used.

In the embodiment shown, the tongue is supported in the non-operative position by the lever arrangement 11. The lever member 11a prevents the tongue from rotating past flush with the upper surface of the support, and also minimises the passing of items such as material, debris, or the like through the aperture 13 of the tongue when the tongue is in the non-operative position. Rather than relying on the lever arrangement 11 as a stop, a stop could be formed as part of, or connected to, the support. A stop could also define the point of maximum angular extension of the tongue 5 relative to the support 3. Again, the stop could be formed as part of, or connected to, the support 3.

Figure 7:
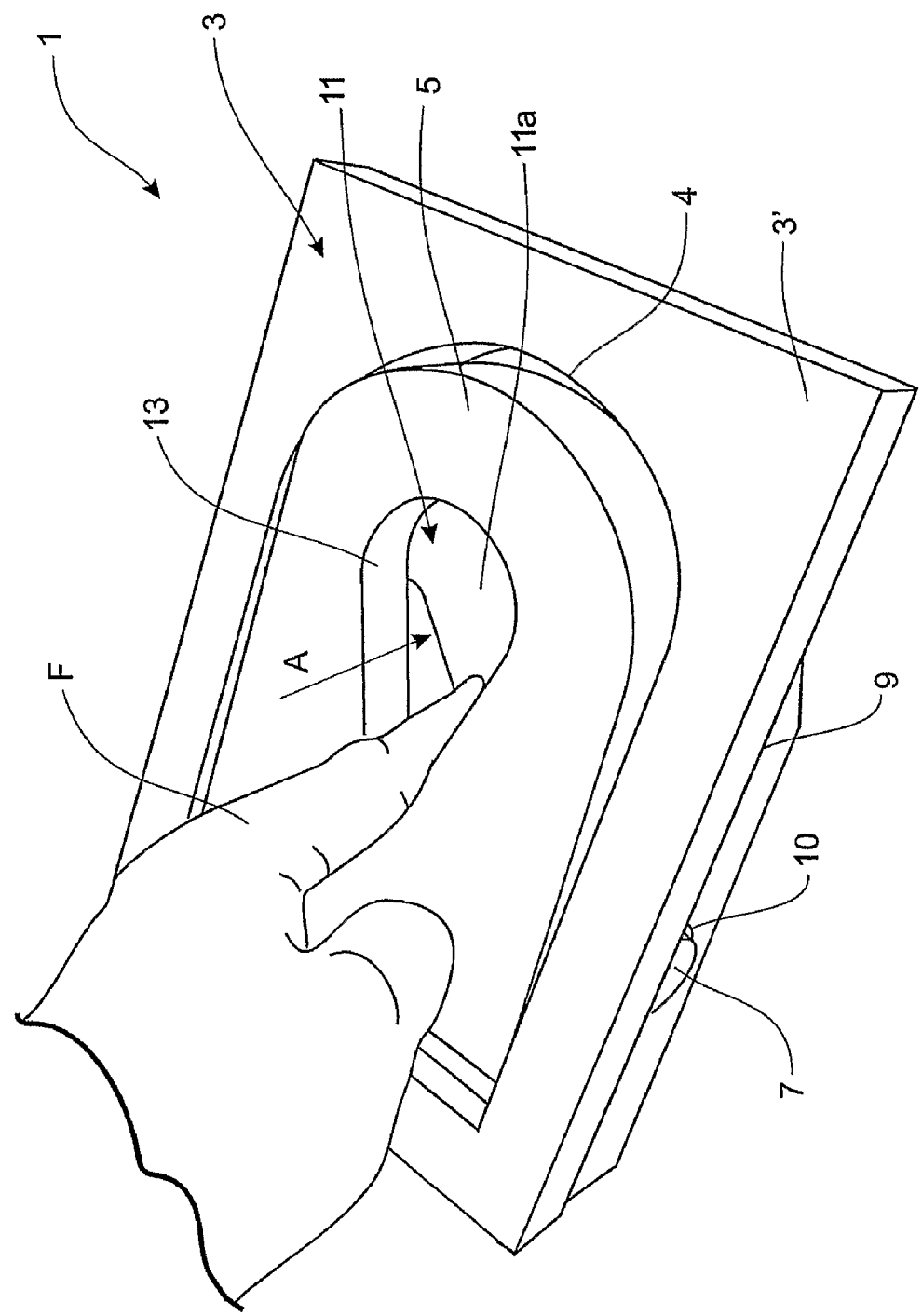
FIG. 7 is an overhead perspective view showing a user moving the load anchor of FIG. 1 from the non-operative position toward the operative position.

FIG. 7 shows a user's finger F pushing downwardly as shown by arrow A through the aperture 13 of the tongue 5, at the end of the aperture 13 closest to the pivot shaft 7. As can be seen in the diagram, the aperture 13 in the tongue is preferably generally tear-drop shaped, with the narrower portion of the aperture 13 towards the proximal end of the tongue and the broader portion of the aperture 13 towards the distal end of the tongue 5. That provides sufficient space for the user to push downwardly on the portion of the lever member 11a towards the proximal end of the tongue, while still maintaining satisfactory strength in the tongue.

Figure 8:
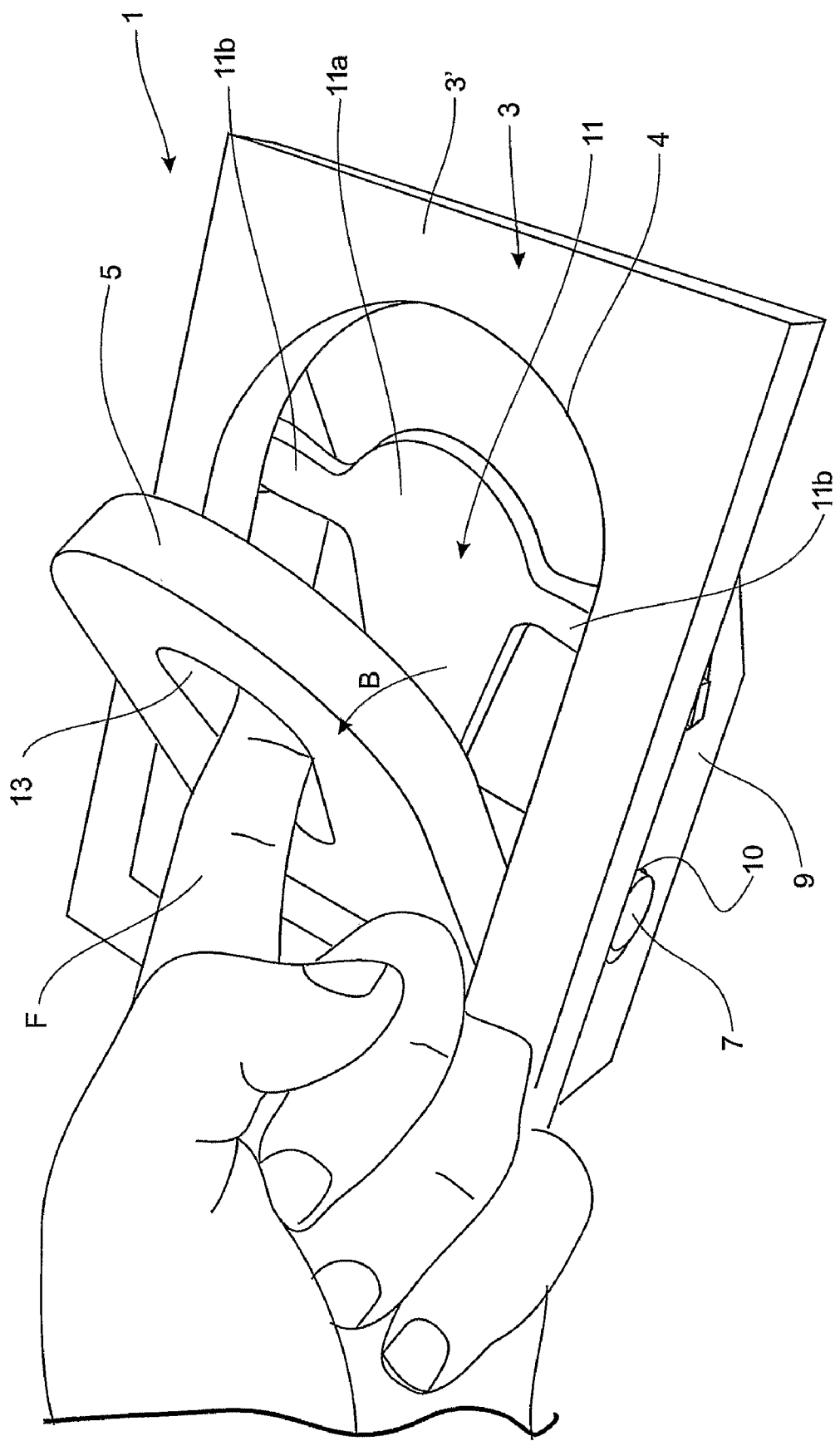
FIG. 8 is an overhead perspective view showing a user moving the load anchor of FIG. 1 further toward the operative position.

By pushing the end of the lever member 11a proximal the pivot shaft 7 downwardly relative to the support 3, the end of the lever member 11a distal the pivot shaft 7 moves upwardly relative to the support 3. The pivoting of the lever member occurs about 11b,15. The distal end of the lever member 11a pushes upwardly against the underside of the free end of the tongue 5, thereby raising the distal end of the tongue relative to the support. In the raised position, it is easier for the user to grip the tongue 5 through the aperture 13 and/or about the distal end of the tongue 5, and pull it in the direction B indicated in FIG. 8 towards the operative position.

The support 3, tongue 5, side flanges 9, and lever arrangement 11 are typically made of thick medium tensile steel plate (preferably grade 350 steel). The pivot shaft 7 is typically made of a medium tensile steel bar (preferably grade 350 steel) and welded at or towards the proximal end of the tongue. As will be mentioned below, the load anchor has been found to have improved load capacity (and especially side loading capacity) by providing an integral tongue and shaft. While the improved side loading is achieved by forming an integral tongue and shaft by welding, the loading capacity can be improved further by integrally casting the tongue and shaft from a suitable material such as steel. The support plate may be integrally cast with the side flanges.

The dimensions and materials are chosen for each component such that the load anchor is able to withstand the loading from a heavy object such as a vehicle. In the embodiment shown, the load anchor has an eight tonne load rating, but it will be appreciated that other materials and dimensions may be used for lighter or heavier weight applications. For example, a load anchor with a ten tonne or five tonne load rating may be provided. Suitable materials are mild steel, high tensile steel, other metals such as alloys, or alternative materials such as plastics for some applications. Stainless steel may be particularly useful for marine applications for example.

The components of the load anchor may be galvanised and/or painted to prevent corrosion and for aesthetic purposes.

Figure 9:
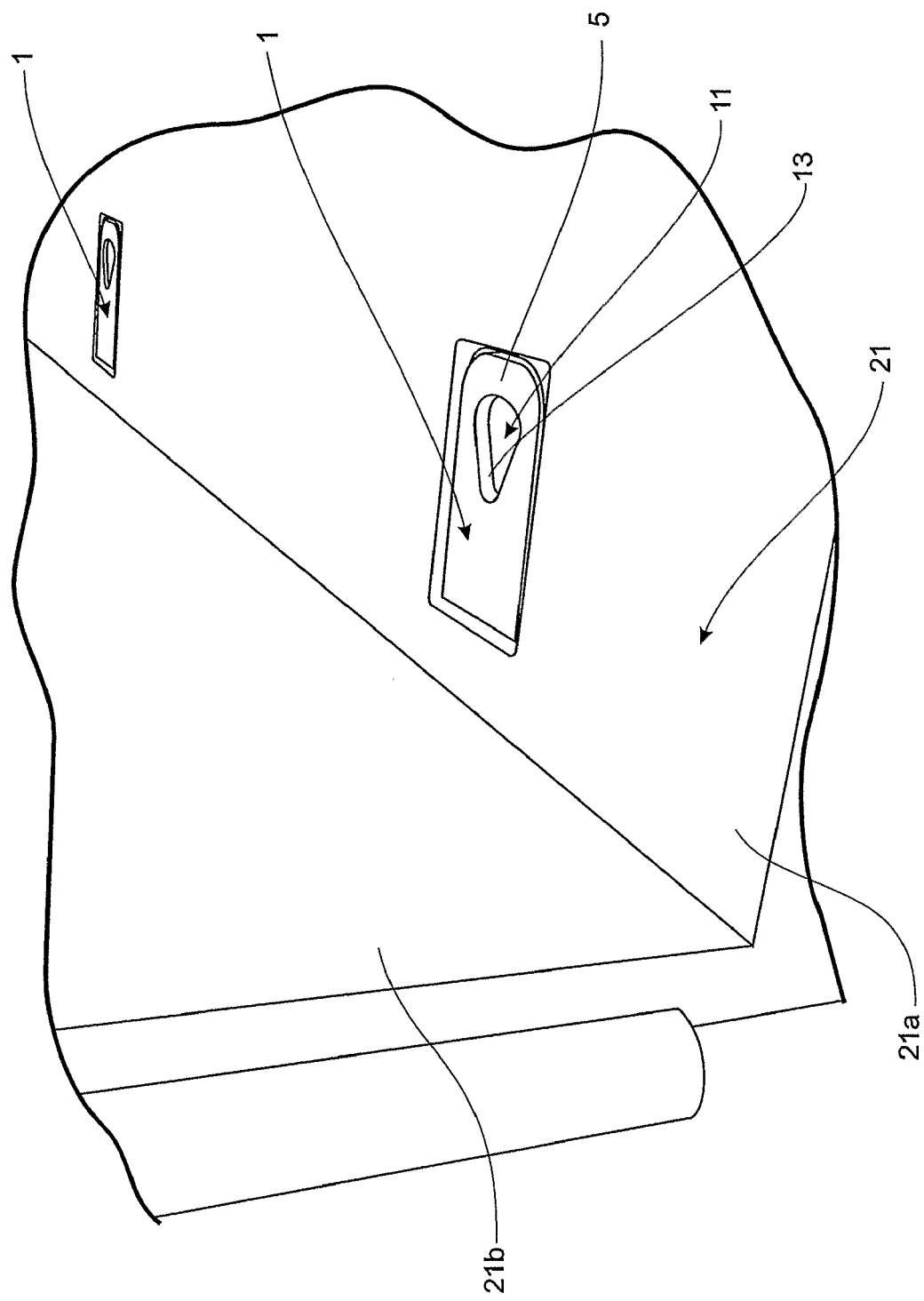
FIG. 9 shows two load anchors in accordance with a first preferred embodiment mounted to a load carrying region of a vehicle and in a non-operative position.

FIG. 9 shows two preferred embodiment load anchors 1 mounted to a load carrying region of a vehicle, which in this embodiment is a truck tray 21 having load supporting surfaces in the form of a floor 21a and side walls 21b (only one of which is shown). While a truck tray is described, the load anchors could be used in other load carrying regions such as truck decks. Further, the load anchors could be used in other vehicles such as a trailer for use with a truck, an aircraft, ship, train, rail car, or a shipping container, for example. Generally, the load anchors will be mounted in the floor of the load carrying region, but could be mounted elsewhere such as in side walls of the load carrying region. In the embodiment shown, the load anchors 1 are installed in the floor 21a of the tray so the load anchor tongue 3 is substantially flush with the floor 21a of the tray when in the non-operative position.

Figure 10:
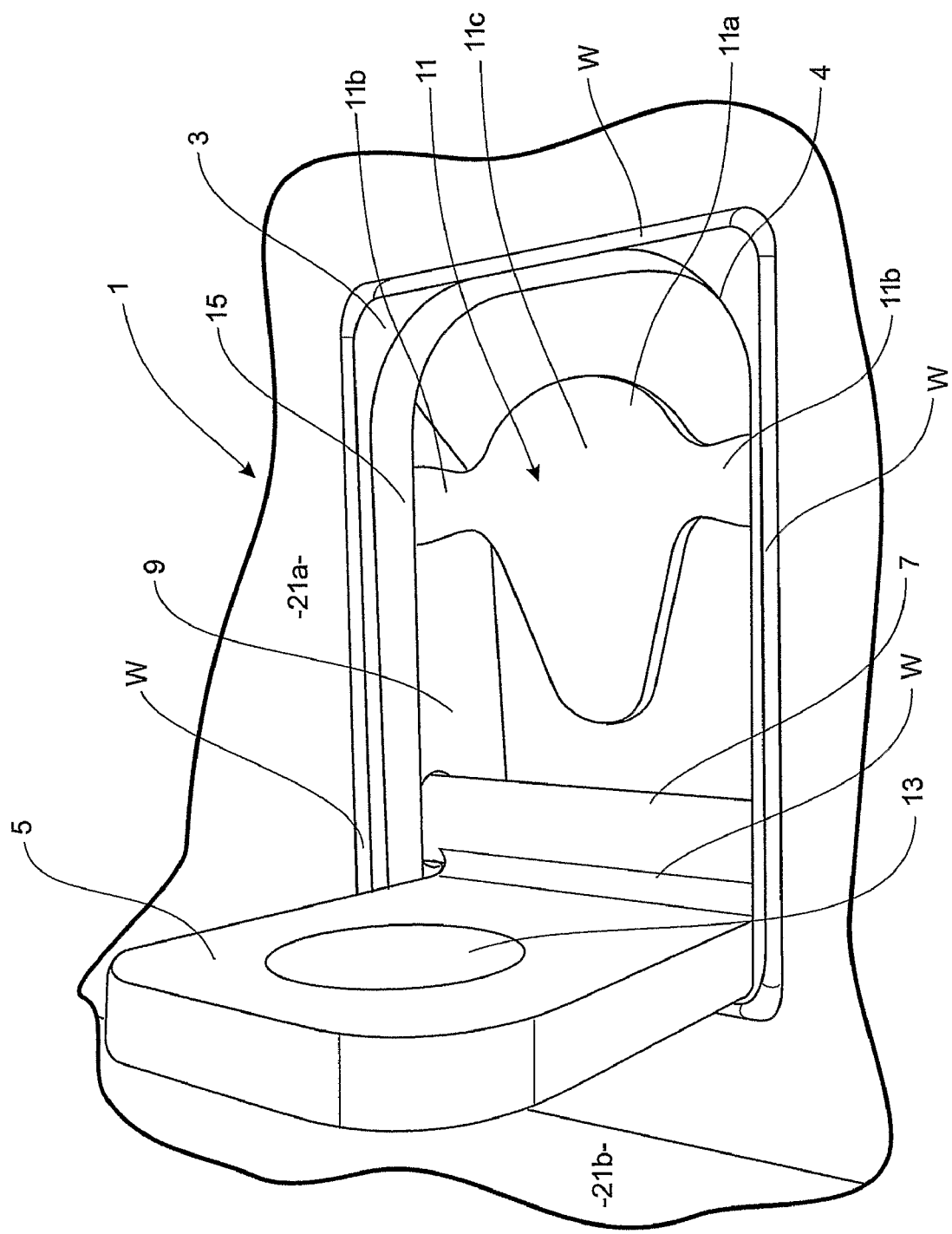
FIG. 10 shows the first preferred embodiment load anchor mounted to the load carrying region of the vehicle in the operative position.
Figure 11:
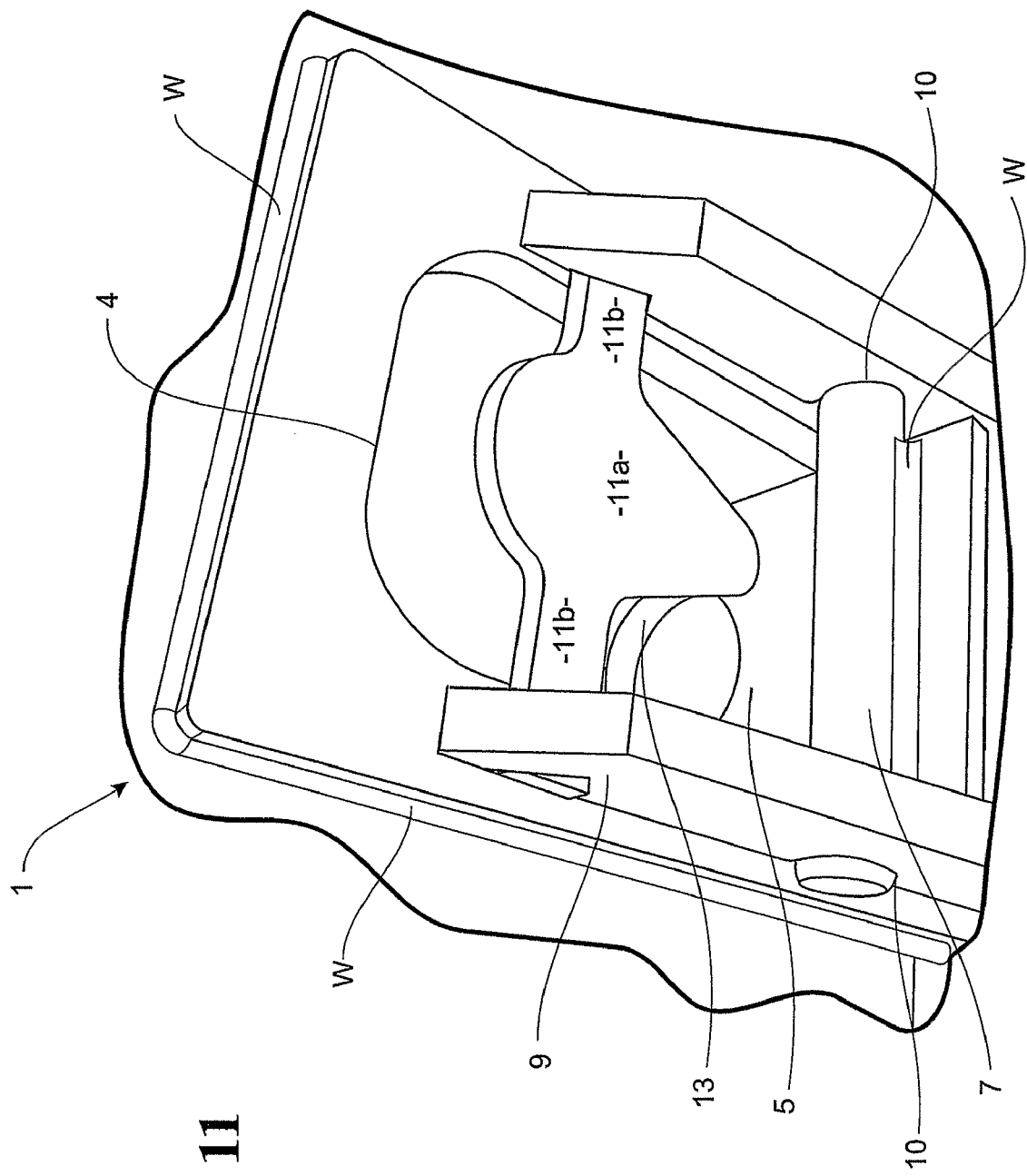
FIG. 11 shows the underside of the first preferred embodiment load anchor mounted to the load carrying region of the vehicle.
Figure 12:
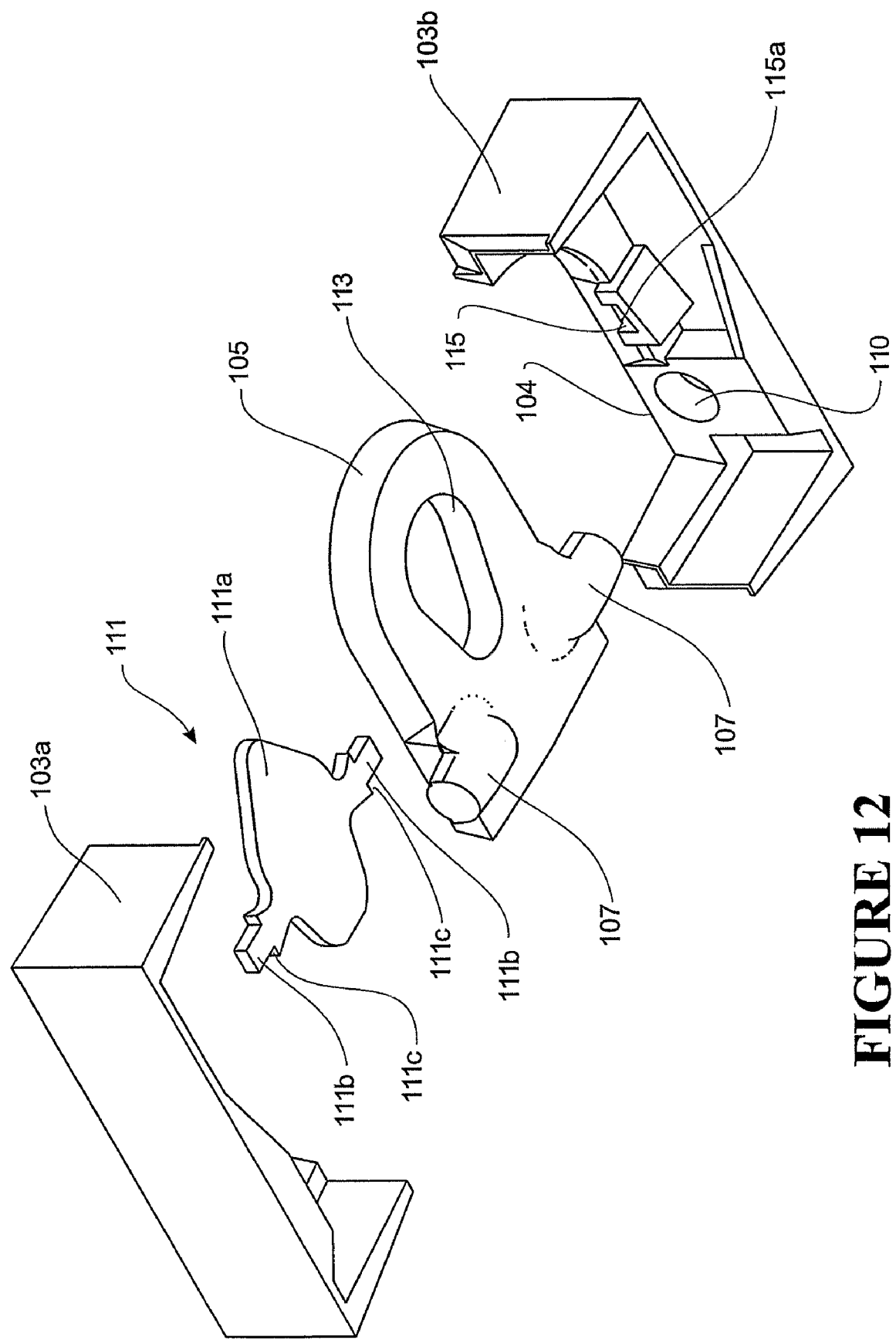
FIG. 12 is an underside exploded perspective view of the components of the second preferred embodiment load anchor.
Figure 13:
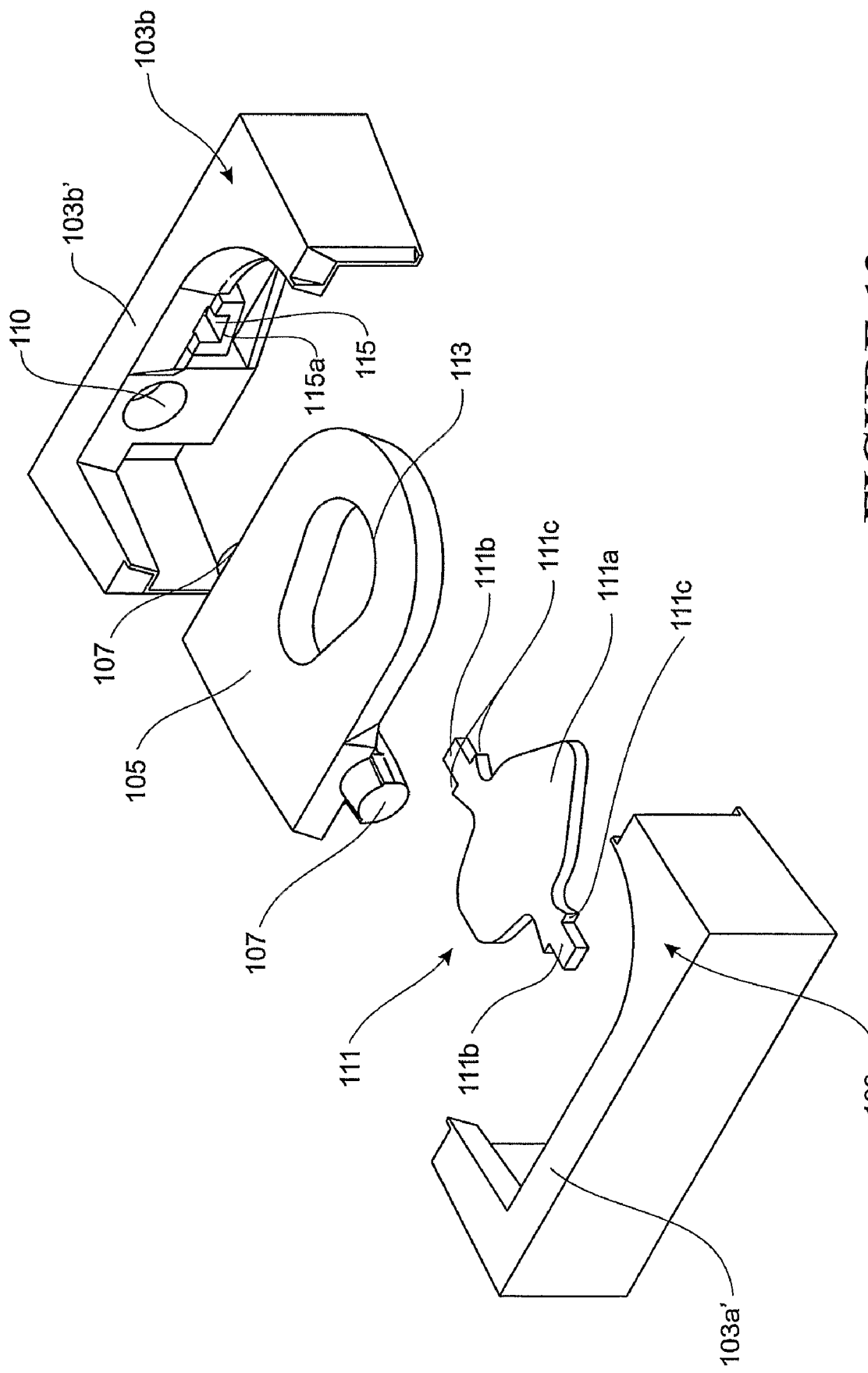
FIG. 13 is an overhead exploded perspective view of the components of a second preferred embodiment load anchor.
Figure 15:
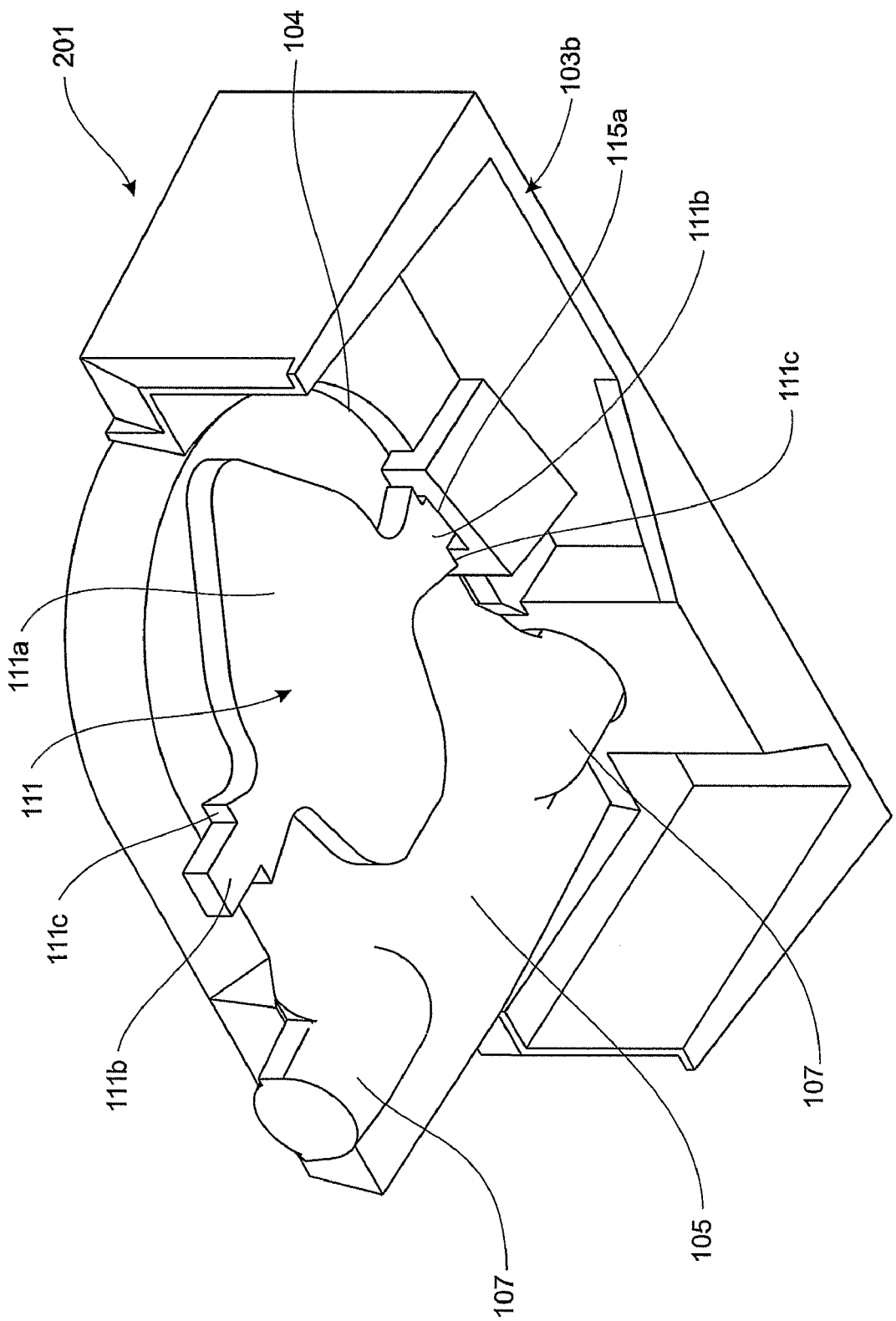
FIG. 15 is an underside perspective view showing part of the assembled second preferred embodiment load anchor, in the non-operative configuration (with one half of the housing excluded for clarity)

In the embodiment shown, the base plate is fixed to the underside of the floor or to a cross member (not shown) under the floor. In one embodiment, a hole 23 is cut in the floor of the tray of the truck that is slightly smaller than the support member 3 and the support member 3 is welded to the underside of the floor, as shown by welds W in FIG. 11. As shown in FIG. 10, welds W may be provided around the perimeter of the hole and in contact with the upper surface of the support 3. This position of the base plate ensures that the load anchor assembly does not protrude into the load carrying area while in the non-operative position.

As can be seen from FIGS. 9 and 10, the tongue 5 is moveable from a first, non-operative position where it is substantially flush with the floor 21a to a second, operative position extending generally upwardly from the floor such that the aperture 13 is exposed above the floor 21a. The non-operative position is shown in FIG. 9 and the operative position is shown in FIG. 10.

When not being used, the load anchor will be in the non-operative position shown in FIG. 9 with the tongue flush with the floor 21a. The load or vehicle (not shown) is then moved onto the floor 21a. As the load anchors are in their non-operative positions, there will be little or no interference between the load anchors and the load. Tie down rope(s), strap(s), or chain(s) or similar (not shown) are then stretched over the load. Each tongue is manually pivoted upwards to an operative position as shown in FIG. 10, by pushing downwards on the lever member 11a at its end towards the pivot shaft 7 of the tongue 5 and then lifting the tongue 5 so that the aperture 13 is exposed above the floor 21a. This position allows the tie down rope(s) or strap(s) to be threaded through or connected to the aperture 13 in the tongue 5, securing the load to the deck 21a. The load would generally be removed from the deck using the reverse of the procedure described.

In another embodiment of the invention, the tongue 3, pivot shaft 7, side flanges 9, and lever arrangement 11 may be assembled directly to the vehicle without a separate support 3. In that case, the load supporting surface of the vehicle along with the side flanges 9 could constitute a support of the load anchor. Alternatively, the tongue 3 could be pivotally mounted directly to the load supporting surface of the vehicle, in which case the load supporting surface could constitute the support of the load anchor.

In an embodiment in which the load anchor is mounted to a vertical or substantially vertical load supporting surface, the tongue preferably hangs to be substantially flush with the supporting surface.

A second preferred embodiment load anchor 201 is shown in FIGS. 12 to 17*c*. Unless described below, the features and operation should be considered to be the same as described above and like numerals are used to indicate like parts, with the addition of 100.

The second preferred embodiment load anchor differs in that its support 103 is in the form of a housing. The housing preferably has two parts 103*a*, 103*b*, and will generally be formed by a casting process. All of the required features which were provided in the first preferred embodiment by the side flanges 9 and plate-like support member 3 are formed as part of the housing 103. The housing 103 provides the aperture 104 for receipt of the tongue 105. Each housing part 103*a*, 103*b* includes an aperture or recess 110 for receipt of a respective stub shaft 107 of the tongue 105, as well as an aperture or recess 115 for receipt of a respective arm 111*b* of the lever arrangement 111. The housing parts 103*a*, 103*b* may be welded together to capture the tongue and lever arrangement therebetween, or may be a press fit together (and the desired strength will be obtained when the support member housing 103 is welded in position on a vehicle).

The tongue 105 differs in that it is a cast component, with stub shafts 107 which extend outwardly from the tongue being cast as an integral part of the tongue. In an alternative embodiment, a full pivot shaft may be cast as an integral part of the tongue.

Each arm of the lever arrangement is provided with shoulders 111*c*. The shoulders 111*c* assist in minimising transverse movement of the lever member 111*a* relative to the support housing 103.

To assemble the load anchor 201, one stub shaft 107 of the tongue 105 and one extension 111*b* of the lever arrangement 111 are inserted in respective apertures or recesses 110, 115*a* of one part of the housing. The other part of the housing is then brought into engagement the first part of the housing such that the other stub shaft 107 of the tongue 105 and the other arm 111*b* of the lever arrangement 111 are received in respective apertures or recesses 110, 115*a* of that other part of the housing, so that the tongue 105 and lever arrangement 111 are captured therebetween. The two parts of the housing are press-fit or welded together, and the housing will then generally be fitted to a vehicle in a desired position, such as in the manner described above with reference to the first embodiment. It will be appreciated that the tongue 105 and lever arrangement 111 will be pivotable relative to the support member housing in the manner described above for the first embodiment.

The general operation of the second preferred embodiment load anchor should be considered the same as for the first embodiment outlined above. In the embodiment shown, the components of the load anchor may be made out of medium tensile steel, and the sizes of the components can be selected such that the second preferred embodiment load anchor has an eight tonne load capacity. Alternative materials and component sizes can again be selected to provide a higher or lower load capacity.

It is preferred for both of the above embodiments, that the load anchors are configured such that when their tongues are in the first, non-operative positions, the plate-like levers will be substantially in contact with the tongue, and will preferably fully cover the underside of the apertures in the tongues. As such, the load anchors are generally closed when their tongues are in the first positions, which helps minimise any passing of debris through the load anchors when the tongues are in their first, non-operational positions. That also helps minimise the entry of water or dirt from the road into the load carrying region through the load anchors are in their first, non-operative positions. That makes the load anchors particularly suitable for use in the trays of tipping trucks, which may at times be filled with gravel, soil, or the like, but which at other times require high capacity load anchors. Further, when the tongues are in the second, operative positions, the load anchors are generally open which allows debris to fall through the load anchors. That helps prevent clogging of the load anchors.

The preferred embodiment load anchors provide tongues that are easy to move out of their non-operative position, even if wet or dirty, due to the provision of the lever arrangement. Further, by providing the load anchors with integral shaft(s), the load anchors have high side-loading capacity. As the load anchors need not be housed in a fully enclosed housing, the load anchors may also be self-cleaning to some extent. In particular, as part of the lever member is pushed downwardly to lift the tongue, debris caught in aperture of the tongue will generally slip off the lever member. It will be appreciated that not all advantages need apply to all embodiments of the present invention.

Preferred embodiments of the invention have been described by way of example only and modifications may be made thereto without departing from the scope of the invention.

For example, while the integral tongue and pivot shaft(s) are described with reference to the particular load anchors shown, will be appreciated that such a configuration has application to other load anchors to improve their side loading capacity.

Further, in the embodiments shown the pivot shaft(s) is/are below the plane of the tongue. Instead, the pivot shaft(s) could be substantially aligned with the tongue, with the apertures or recesses for receipt of the shaft(s) being positioned higher than in the embodiments shown.

Further, rather than having a support which is mounted in or beneath the load supporting surface of a load carrying region of a vehicle, the tongue could be pivotally mounted directly in apertures in the load supporting surface of the load carrying region, or in flanges connected directly to the load carrying region.

What is claimed is:

1. A load anchor comprising:
   a support having an upper surface;
   a tongue with an aperture for receipt of part of a tie down strap and which is pivotable relative to the support from a first position wherein the tongue is substantially flush with the upper surface of the support to a second position extending generally upwardly from the support such that the aperture is at least partly exposed above the upper surface; and
   a lever arrangement beneath the tongue and accessible through the aperture in the tongue when the tongue is in the first position, configured such that downward force applied to part of the lever arrangement through the aperture pivots the lever arrangement which lifts the tongue from the first position.

2. A load anchor as claimed in claim 1, wherein the lever arrangement comprises a lever member which is pivotally mounted below the tongue.

3. A load anchor as claimed in claim 1, wherein the lever arrangement is configured to substantially cover the aperture in the tongue from its underside when the tongue is in the first position.

4. A load anchor as claimed in claim 1, wherein the support comprises two flanges, and wherein the tongue and lever arrangement are pivotally mounted to the flanges.

5. A load anchor as claimed in claim 1, wherein the support comprises a housing which generally surrounds a perimeter of the tongue when the tongue is in the first position.

6. A load anchor as claimed in claim 5, wherein an underside of the housing is generally open, to enable debris to exit the housing when the tongue is out of the first position.

7. A load anchor as claimed in claim 1, configured such that when the tongue is in the first position the load anchor is generally closed to minimise any passing of debris through the load anchor from above the upper surface, and when the tongue is in the second position the load anchor is generally open to enable debris to fall through the load anchor from above the upper surface.

8. A load anchor as claimed in claim 1, wherein the tongue is pivotally mounted relative to the support by a pivot shaft or shafts.

9. A load anchor as claimed in claim 8, wherein the tongue is pivotally mounted relative to the support by two stub shafts, one of which extends outwardly from each side of the tongue to pivotally engage the support.

10. A load anchor as claimed in claim 8, wherein the shaft(s) is/are integral with the tongue.

11. A load anchor as claimed in claim 10, wherein the tongue and shaft(s) are an integrally cast component.

12. A load anchor as claimed in claim 8, wherein the shaft(s) is/are rotatable relative to the support about an axis of rotation, and the tongue is substantially planar, and wherein the tongue is configured with the shaft(s) such that the plane of the tongue is generally parallel with the axis of rotation of the shaft(s).

13. A load anchor as claimed, in claim 1, which has a load capacity of at least about 8 tonnes.

14. A lead anchor as claimed in claim 1, when mounted to load carrying region of a vehicle such that in the first position of the tongue the tongue lies substantially flush with a floor of the load carrying region, and in the second position of the tongue, the aperture in the tongue is at least partly exposed above the floor of the load carrying region.

15. A load anchor as claimed in claim 1, when mounted to a load carrying region of a vehicle such that the first position of the tongue, the tongue lies substantially flush with a wall of the load carrying region, and in the second position of the tongue, the aperture of the tongue is at least partly exposed inwardly of the wall of the load carrying region.

16. A load anchor as claimed in claim 1, wherein the aperture in the tongue is fully exposed when the tongue is in the second position.

17. A vehicle for carrying a load, the vehicle comprising:
a load carrying region having a load supporting surface; and at least one load anchor which comprises:
a tongue with an aperture for receipt of part of a tie down strap and which is pivotable relative to the load supporting surface from a first position wherein the tongue is substantially flush with the load supporting surface to a second position in which the tongue extends from the load supporting surface such that the aperture is at least partly exposed in the load carrying region; and
a lever arrangement beneath the tongue and accessible through the aperture in the tongue when the tongue is in the first position, configured such that force applied to part of the lever arrangement through the aperture pivots the lever arrangement which moves the tongue from the first position towards the second position.

18. A vehicle as claimed in claim 17, wherein the lever arrangement comprises a pivotally mounted lever member.

19. A vehicle as claimed in claim 17, wherein the lever arrangement is configured to substantially cover the aperture in the tongue from one side when the tongue is in the first position.

20. A vehicle as claimed in claim 17, wherein the load supporting surface is a floor of the load carrying region and wherein a region beneath the lever arrangement is generally open, to enable debris to exit the load anchor when the tongue is out of the first position.

21. A vehicle as claimed in claim 17, wherein the load anchor is configured such that when the tongue is in the first position the load anchor is generally closed to minimise any passing of debris through the load anchor, and when the tongue is in the second position the load anchor is generally open to enable debris to pass through the load anchor.

22. A vehicle as claimed in claim 17, wherein the tongue is pivotally mounted relative to the load supporting surface by a pivot shaft or shafts.

23. A vehicle as claimed in claim 22, wherein the tongue is pivotally mounted relative to the load supporting surface by two stub shafts, one of which extends outwardly from each side of the tongue.

24. A vehicle as claimed in claim 22, wherein the shaft(s) is/are integral with the tongue.

25. A vehicle as claimed in claim 24, wherein the tongue and shaft(s) are an integrally cast component.

26. A vehicle as claimed in claim 22, wherein the shaft(s) is/are rotatable relative to the load supporting surface about an axis of rotation, and the tongue is substantially planar, and wherein the tongue is configured with the shaft(s) such that the plane of the tongue is generally parallel with the axis of rotation of the shaft(s).

27. A vehicle as claimed in claim 17, wherein the aperture in the tongue is fully exposed when the tongue is in the second position.

28. A vehicle as claimed in claim 17, wherein the vehicle is a truck.

29. A vehicle as claimed in claim 17, wherein the vehicle is a trailer for use with a truck.

30. A vehicle as claimed in claim 17, wherein the vehicle is a shipping container.

* * * * *